June 6, 1944.  N. M. LOWER  2,350,910
FUEL CONDITIONING AND FEEDING APPARATUS
Filed March 1, 1940  5 Sheets-Sheet 4

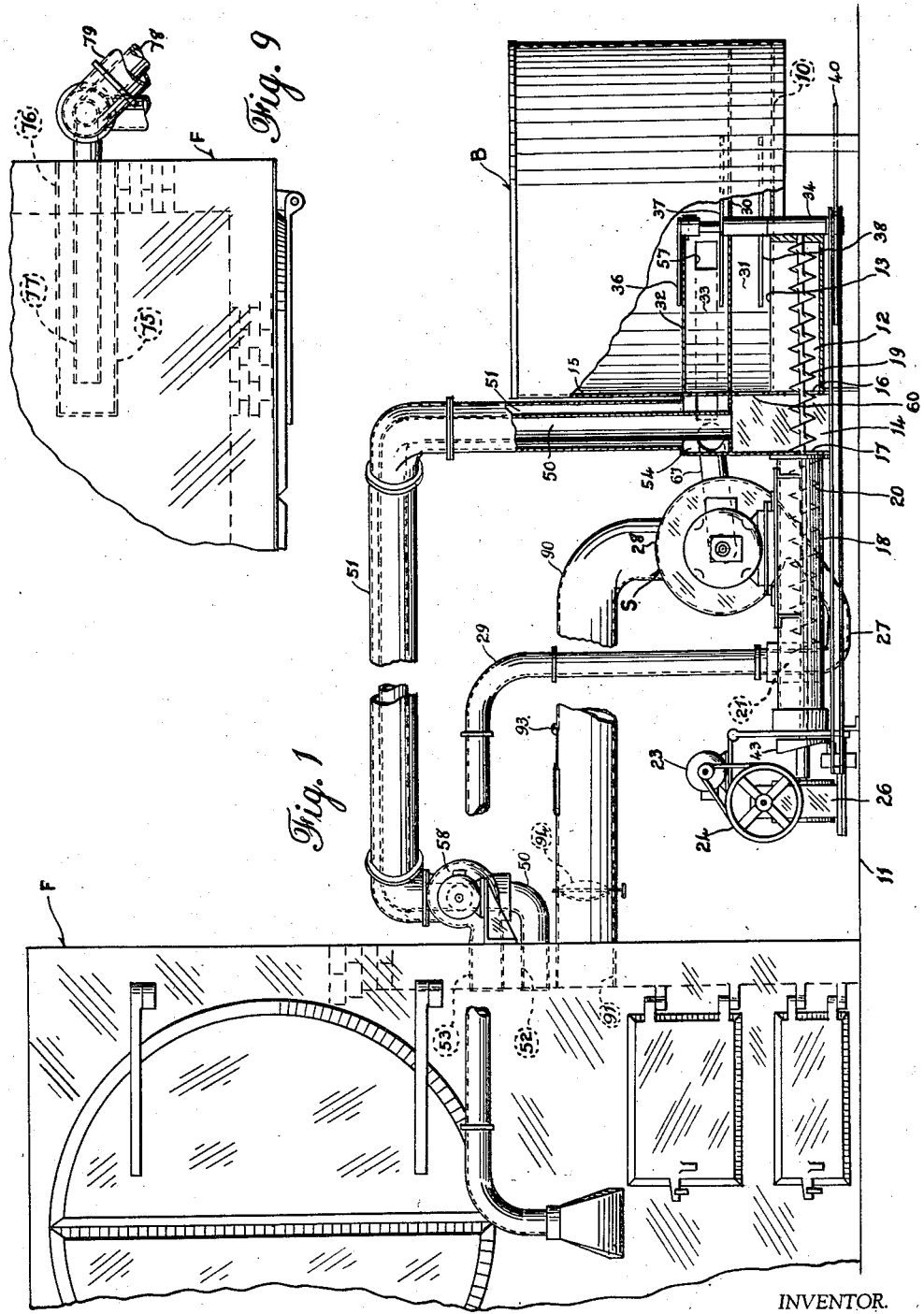

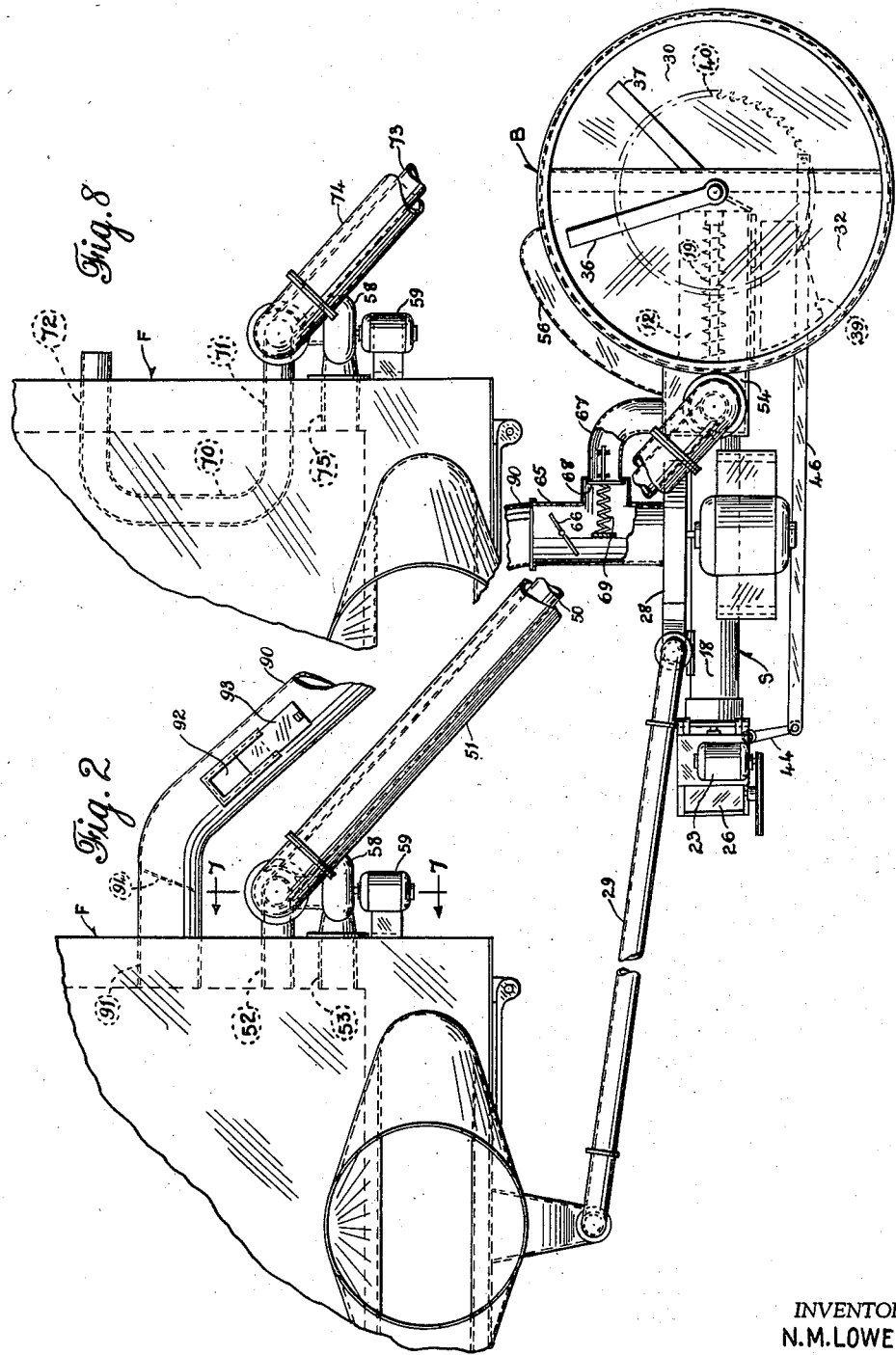

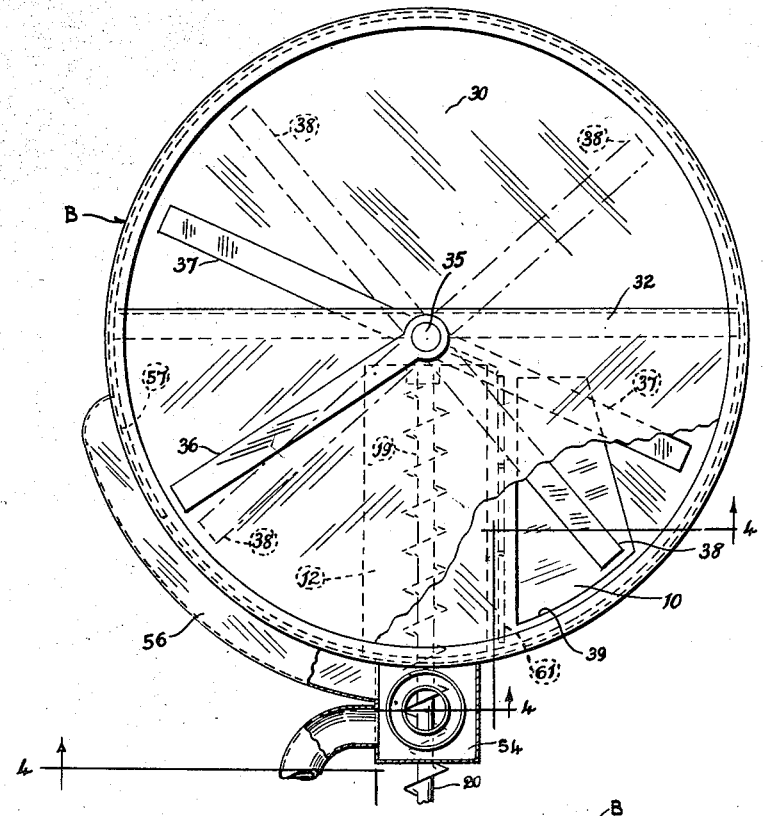
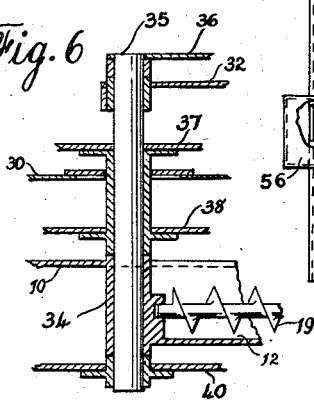
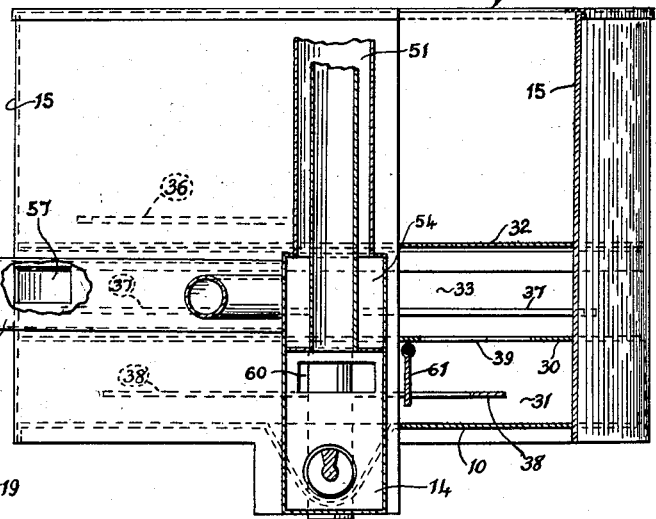

INVENTOR.
N. M. LOWER
BY
ATTORNEY.

June 6, 1944.　　　　N. M. LOWER　　　　2,350,910
FUEL CONDITIONING AND FEEDING APPARATUS
Filed March 1, 1940　　　5 Sheets-Sheet 5

INVENTOR.
N. M. LOWER.
BY
ATTORNEY.

Patented June 6, 1944

2,350,910

UNITED STATES PATENT OFFICE 2,350,910

FUEL CONDITIONING AND FEEDING APPARATUS

Nathan M. Lower, Erie, Pa.

Application March 1, 1940, Serial No. 321,747

3 Claims. (Cl. 34—173)

This invention relates to material conditioning and feeding apparatus, and particularly to apparatus for drying coal prior to its delivery to a furnace firebox.

An object of the invention is to provide a material containing bin or hopper including novel, efficient, compact means for rapidly drying material in the bin or hopper.

Another object of the invention is to provide a material containing bin or hopper including means for effectively drying material while continuously withdrawing the dried material from the bin or hopper.

More specifically, an object of the invention is to provide a novel fuel hopper formed with a plurality of chambers and having means for moving fuel therethrough while subjecting the fuel during its passage through the chambers to a continuous flow of hot gases.

Another object of the invention is to provide a fuel drying hopper of the kind described with means for conducting hot gases thereto from a furnace or other source of supply, said means having an enclosing jacket arranged with the hopper for the passage therethrough of the gases after effecting their fuel drying function.

Another object of the invention is to provide in combination with a hopper of the type described, means for conveying the heat treated fuel from the hopper and simple, efficient and compact means for coordinating the operation of the fuel conveying means and the means for moving the fuel through the hopper chambers.

Another object of the invention is to provide a novel fuel conditioning and feeding apparatus by which hot furnace gases are circulated through moisture laden fuel while in transit through a hopper, and utilizing the gases after circulating through the fuel to pneumatically convey the conditioned fuel to a furnace.

In stokers provided with a pneumatic conveyor for delivering fuel from the bin or hopper to the furnace, wet coal will clot and pack in the conveyor tube interrupting the flow of fuel to the furnace. Attempts have been made to remedy this condition by localized heating of parts of the conveyor tube but these attempts have not proved successful where the fuel contained a substantial amount of moisture. The use of hot gases to convey moisture laden coal has also not been entirely successful, particularly in cases where the coal must be conveyed distances upward of twenty feet, since over such distances the moisture will partially condense in the coal tube and clogging thereof will occur.

It is, therefore, another object of this invention to provide a drying hopper, constructed and combined with a furnace and a pneumatic stoker so that fuel containing a substantial amount of moisture is dried and pneumatically conveyed to the furnace from the hopper for distances upward of twenty feet, limited only by the capacity of the fan, without clogging and packing of fuel in the fuel tube.

These and other objects of the invention, residing in the construction, arrangement and combination of the various parts of the apparatus, will become apparent from the following description when read in connection with the accompanying drawings, in which Fig. 1 is a view in elevation of the drying hopper and stoker as applied to a boiler, parts of the hopper and stoker being broken away and shown in section;

Fig. 2 is a plan view of the construction shown in Fig. 1 with parts broken away and shown in section;

Fig. 3 is a plan view of the novel fuel hopper with parts broken away;

Fig. 4 is a sectional view through the hopper taken on the irregular line 4—4 of Fig. 3;

Fig. 6 is a fragmentary vertical sectional view through the center of the hopper;

Fig. 8 is a fragmentary plan showing a modification of the preferred form of the furnace and piping arrangement for heating the drying medium for the coal;

Fig. 9 is a fragmentary plan view showing still another modification of the preferred form of the furnace and piping arrangement for heating the drying medium for the coal;

Figure 5:
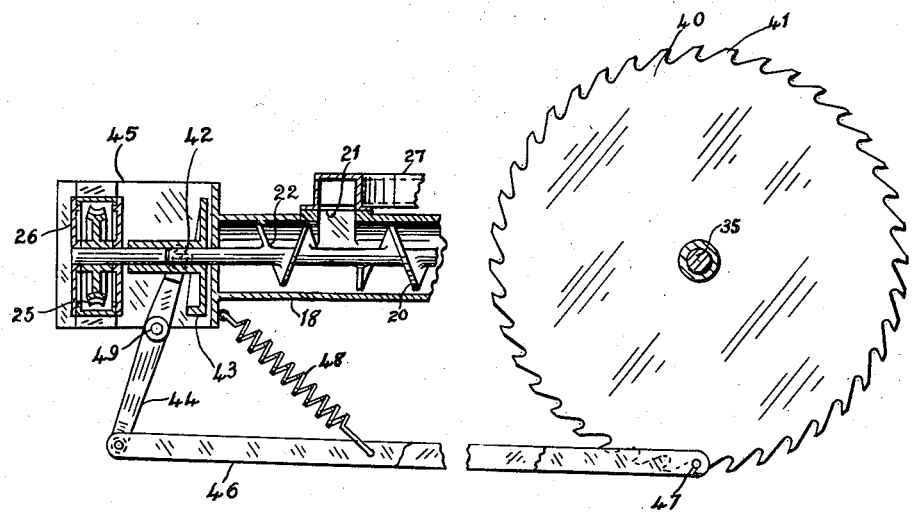
Fig. 5 is a sectional view through the operating mechanism for the arms in the fuel hopper.

In the drawings, referring particularly to Fig. 1, a furnace is shown at F and a fuel bin or hopper at B. A stoker, indicated generally by the letter S, feeds fuel from the hopper to the furnace.

The fuel hopper B is preferably cylindrical in shape, and the bottom 10 thereof is preferably disposed above the level of the furnace room floor 11 in order to make certain hereinafter described mechanism, on the underside of the hopper bottom 10, freely accessible.

For convenience in describing the relation of parts, the terms "forward" and "front," and "rearward" and "rear" will be used in the description of the hopper and stoker relative to the direction of travel of the coal from the hopper to the furnace.

The hopper bottom 10 is provided with a depending radially extending elongated trough 12, preferably formed integral therewith, and coal passes from the hopper B into the trough 12 through the open mouth 13 thereof. At its forward end, the trough 12, communicates, through an opening 16, with a compartment or box 14, disposed adjacent the lower end of the upright wall 15 of the hopper B. The wall of compartment 14 opposite the opening 16 is provided with an opening 17 registering with one end of a conduit 18. This conduit extends forwardly from the compartment 14 in axial alinement with the trough 12 and is supported at its forward end in any suitable manner on the furnace room floor 11.

Coal entering the trough 12 from the hopper B is conveyed forwardly therethrough into the compartment 14 by a screw conveyor 19 which is mounted in the trough 12 and extends through the opening 16 into the compartment 14. A screw conveyor 20 is operatively connected with the screw conveyor 19 and conveys coal from the compartment 14 forwardly through the conduit 18 to a discharge opening 21 near the forward end of conduit 18. As shown in Fig. 5, the screw conveyor 20 is provided at its forward end, between the forward end of the conduit 18 and the discharge opening 21 therein, with a reverse flight 22. The reverse flight 22 prevents packing of the coal at the forward end of the conduit 18 and aids in urging coal through discharge opening 21.

The coal screw conveying system, comprising the screws 19 and 20 is driven from its forward end by a motor 23 through suitable reduction gearing 25 mounted in the gear housing 26. Suitable means, such as the belt and pulley arrangement 24, operatively connects the motor 23 with the gearing 25. Coal is discharged by the screw conveying means through the discharge opening 21 into an upturned arm of a duct 27 leading from the outlet side of the fan casing 28 housing a fan (not shown). From the duct 27, the coal is pneumatically conveyed through the coal pipe system 29 to the furnace F.

In pneumatically conveying fuel, considerable difficulty has been experienced in the past in conveying wet coal, particularly wet coal comprising a large amount of slack, since even a small percent of water in the coal gradually clogs the elbows in the coal pipe and eventually the straight sections of the pipe. In overcoming this difficulty the present invention provides an improved construction and arrangement of the fuel hopper and stoker.

The hopper B is provided with a plate 30 above and parallel with respect to the hopper bottom 10 forming therebetween a chamber 31. Within the hopper, above and parallel with respect to the plate 30 is a half plate 32 extending across approximately half the interior of the hopper forming a chamber 33 between the plate 30 and half plate 32. The hopper bottom 10 is provided centrally thereof, immediately rearward of the trough, with a vertically extending sleeve bearing 34 in which is mounted a vertical shaft 35. The shaft 35 extends upwardly into the hopper through the plate 30 and half plate 32 and projects downwardly below the hopper bottom 10.

The shaft 35 is intermittently rotated a portion of a revolution by means, hereinafter described in detail, associated with the lower end of shaft 35.

An arm 36 is secured to and extends laterally from the shaft 35 above the plane of the half plate 32; a plurality of arms 37 are secured to and extend laterally from the shaft 35 between the planes of the half plate 32 and plate 30; and a plurality of arms 38 are secured to and extend laterally from the shaft 35 between the planes of the plate 30 and the hopper bottom 10. The arms 36, 37 and 38 turn with the shaft 35 which is arranged to be rotated in a counter-clockwise direction. The arm 36 functions to prevent arching of the coal in the hopper, and when the hopper has become somewhat depleted, serves to sweep the coal resting on the half plate 32 onto the plate 30. The arms 37 function to move the coal on the exposed portion of the plate 30 through the chamber 33 to an opening 39 in the plate 30, through which opening the fuel drops onto the hopper bottom at one side of the trough 12. The arms 38 move the coal around the chamber 31 in a counter-clockwise direction to the trough 12. The coal is therefore moved slowly through a circuitous passage before eventually being delivered to the trough 12. For purpose of illustration, one arm 36, two arms 37 and four arms 38 have been shown on the drawings. However, it will be apparent that the number of arms may be varied as conditions warrant. The arms are of a height, such that a portion of the coal will roll over the tops thereof as they move through the coal, thereby preventing the coal from piling up in front of the arms and filling the chambers 31 and 33 with coal immediately in front of the arms. It is desirable to have the chambers 31 and 33 only partially filled in order, as will be shown later, that hot gases may freely circulate therethrough.

In order to assure a continuous and sufficient supply of coal to the trough 12, the arms 36, 37 and 38 need only be operated very slowly. The mechanism for operating the arms 36, 37 and 38 includes a large ratchet wheel 40 provided with a plurality of teeth 41, the ratchet wheel 40 being secured to the lower end of the shaft 35 beneath the hopper bottom 10. On the forwardly projecting shaft portion 42 of the screw conveyor 20 between the gear housing 26 and the end of the conduit 18, there is mounted for rotation with the screw conveyor 20, a cam 43. A lever 44 is pivotally mounted between its ends, as at 49, on a platform 45 so that one end thereof is arranged to contact the cam 43. A push rod 46 is pivotally connected at one end with the opposite end of the lever 44. The free end of the rod 46 is provided with a pin 47, or other suitable means, engaging the teeth 41 of the ratchet wheel 40. A spring 48 holds the rod 46 in engagement with the ratchet wheel 40 and the one end of the lever 44 in contact with the cam 43. Referring particularly to Fig. 5 it will be seen that rotation of the cam 43 causes oscillation of the lever 44 about its pivot 49 which in turn transmits a reciprocating motion to the push rod 46. Movement of the rod 46 in one direction causes the pin 47 to engage the teeth 41 and rotate the ratchet wheel 40 a portion of a turn, while movement of the rod 46 in the reverse direction causes the pin 47 to slide over the teeth 41. The intermittent rotational movement of the ratchet wheel 40 is transmitted to the shaft 35 which in turn moves the arms 36, 37 and 38 whereby coal is advanced through the circuitous passages in the hopper to the trough 12.

In order to effectively and economically dry the coal, hot furnace gases are withdrawn from the furnace F through a pipe 50, then circulated through the chambers 31 and 33 in the hopper S and are returned to the furnace through the return pipe 51, which surrounds the pipe 50 substantially throughout its extent. The pipe 50 communicates at one end with the furnace through an opening 52 in the wall thereof and at its other end with the upper end of the compartment or box 14. The return pipe 51 communicates at one end with the furnace through an opening 53 in the wall thereof and at its other end with a compartment 54 surrounding the end of the pipe 50 remote from the furnace. A casing 56 communicates at one end with the chamber 33 through an opening 57 in the upright wall 15 of the hopper and at its other end with the compartment 54.

Figure 7:
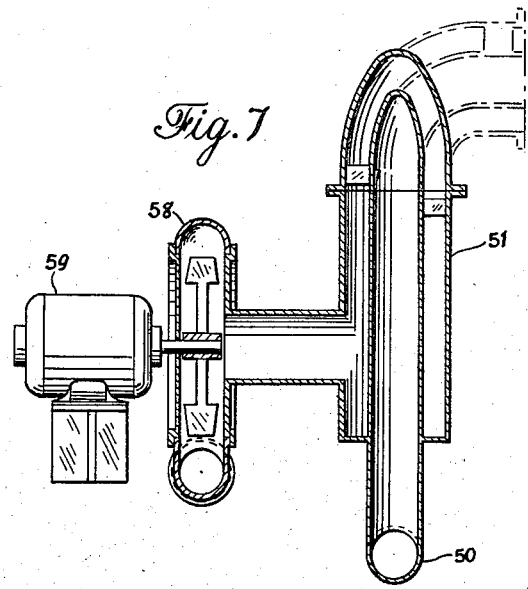
Fig. 7 is a sectional view on the line 7—7 of Fig. 2.

As best shown in Figs. 2 and 7, a fan 58, operated by a motor 59, is interposed in the return pipe 51, the inlet side of the fan being connected with the piping returning from the hopper B and the outlet side of the fan being connected with the opening 53 in the furnace F. The fan 58, so arranged, thus induces a circulation of hot furnace gases from the furnace through the pipe 50 into the compartment 14, thence through opening 60 into the lower chamber 31 of the hopper. A baffle 61 comprising a plurality of hinged plates, longitudinally suspended from plate 30, extending from the upright wall 15 between and parallel to trough 12 and opening 39 in plate 30, thence radially toward the centre of hopper B, causes the hot gases to be circulated through the chamber 31 in a clockwise direction, then upwardly through the opening 39 into the chamber 33 and then in a clockwise direction through the chamber 33 beneath the half plate 32 to the opening 57 in the upright wall 15 of the hopper B. Clockwise movement of hot gases through the chamber 33 is assured by reason of the clockwise movement of the gases as they pass through the opening 39 from the chamber 31 and also by reason of the fact that the chamber 33 beneath the half plate 32 is only partially filled with coal so that hot gases will follow the path of least resistance.

The hot gases from the furnace are circulated through the chambers 31 and 33 in a stream counter-current with respect to the direction of travel of the coal therethrough, thereby effecting an efficient drying action on the coal. Since the height of the arms 36, 37 and 38, as stated above, is such that a portion of the coal rolls over them, cohering masses of coal are broken up so that the hot gases come into intimate contact with the coal particles whereby efficient drying is assured. From the opening 57 the gases, which are now at a reduced temperature but still retain some heat, pass through the casing 56 into the compartment 54 and thence through return pipe 51 into the fan 58 and back into the furnace. With the return pipe 51 enclosing the hot gas pipe 50 and in communication with the furnace, convenient disposition is made of the spent gases, and an effective insulating arrangement is provided, at the same time, for the hot gas pipe 50.

As described above, the heat treated coal is pneumatically conveyed through the coal pipe 29 to the furnace by means of a fluid carrier stream generated by a fan (not shown), in the fan casing 28. I have provided in this invention, an arrangement whereby cold air may be admitted to the fan casing 28, whereby hot furnace gases may be admitted to the fan in casing 28, and whereby hot furnace gases and cold air may be admitted to the fan in any desired proportions. For this purpose a short pipe 65 is provided on the intake side of the fan casing 28. A conduit 90 communicates at one end with the pipe 65 and at its other end opens into the furnace through an aperture 91 in the furnace wall. An opening 92, the size of which may be regulated by a slide plate 93, is provided in the conduit 90 intermediate its ends. A damper 94 is provided in the conduit 90 between the furnace and the opening 92 and a second damper 66 is provided in the pipe 65. The function of the dampers 94 and 66 and opening 92 will become apparent as the description proceeds.

In installations where the stoker is a considerable distance from the furnace so that a long coal feed pipe is necessary there is a possibility that some of the vapors carried along with the heat treated coal may condense in the coal pipe 29 and cause clogging of the coal. In such installations and also when it is desirable to further preheat the coal, the dampers 94 and 66 are opened and the opening 92 is covered by the slide plate 93. Hot gases are then withdrawn from the furnace through the conduit 90 by the fan in the casing 28 and utilized to pneumatically convey the coal through the coal feed pipe 29. The temperature of the gases entering the fan casing 28 may be conveniently regulated by means of the damper 94 and the opening 92. A fan operates more efficiently with cold air than with hot air so that if the coal is sufficiently dry to pass freely through the coal pipe 29 without clogging and if it is not desired to further preheat the coal, cold air alone may be used to pneumatically convey the coal by closing the damper 94 and fully opening the slide plate 93.

In installations where the stoker is relatively close to the furnace, so that the coal pipe 29 is less than approximately 25 feet long, the hot gas conduit 90 may be dispensed with entirely. In such installations the temperature of the carrier fluid may be regulated by proper manipulation of the damper 66. With the damper 66 fully open, cold air may be taken in directly to the fan casing through the open end of the short pipe 65. Heated carrier fluid may be used in such installations by closing the damper 66 whereupon the reduction in pressure in the pipe 65 will cause a valve 68 to open providing for passage of hot gases from the compartment 54 to the pipe 65 through the duct 67. A spring 69 normally holds the valve 68 in its closed position. The relative amount of cold air and hot gases entering the fan casing 28 may be readily regulated by proper manipulation of the damper 66.

In Fig. 8 is shown a modification in which the intake pipe 70, corresponding to the pipe 50 of the preferred construction, passes into the furnace through the opening 71 in the wall thereof and passes out of the furnace through the opening 72 in the wall thereof, instead of opening into the furnace. In the modified form of construction air is drawn through the intake pipe 70 and is heated during its passage through that portion of the pipe 70 that is within the furnace. As in the preferred construction the heated drying medium passes from the pipe 70 through the pipe 73 to the coal hopper and returns through the return pipe 74 and is discharged into the furnace through an opening 75 in the wall thereof. This construction permits the use of heated air instead of the hot furnace gases as the coal drying medium.

In Fig. 9 is shown a modification of the construction shown in Fig. 8. In this construction heated air is used as the coal drying medium but only a single opening in the furnace wall is required instead of the two openings 71 and 72, shown in Fig. 8. A tube 75 extends through an opening 76 in the furnace wall, opening to atmosphere at one end and being closed at that end inside the furnace. A pipe 77 of smaller diameter than the tube 75 extends into and opens within the tube 75, and the other end of the pipe 77 communicates with the pipe 78 leading to the coal hopper. Thus, air enters the tube 75, is heated in the tube and passes through the pipe 77, then through the pipe 78 to the coal hopper and returns to the furnace through the pipe 79.

Figure 10:
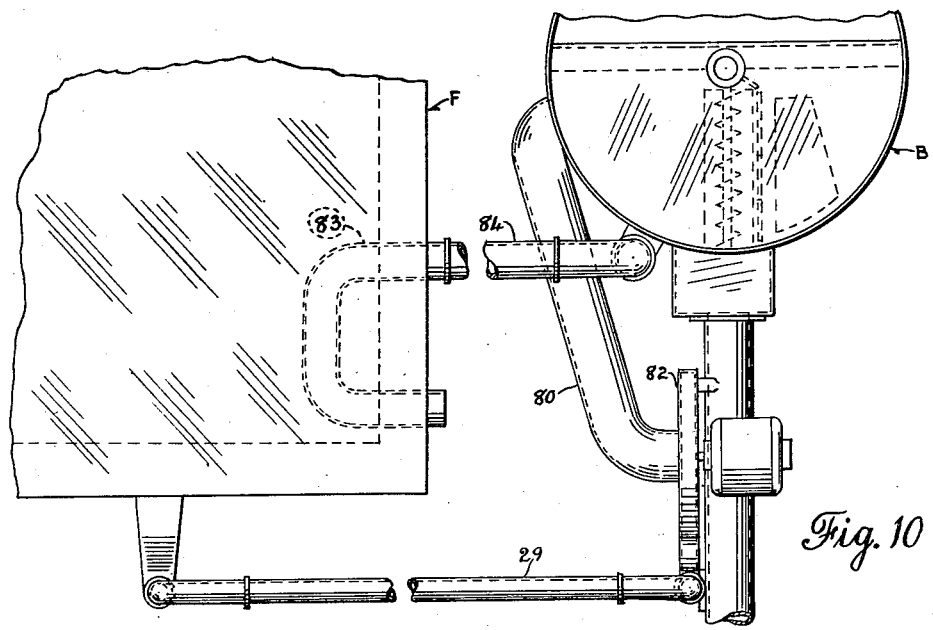
Fig. 10 is a plan view of a modified form of the invention.
Figure 11:
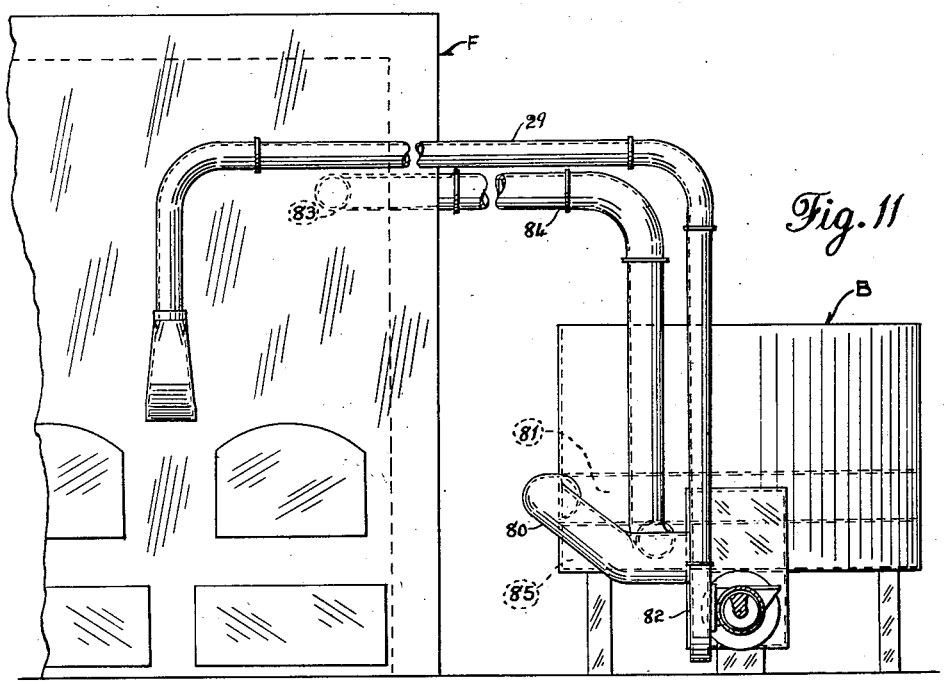
Fig. 11 is a view in elevation of the construction shown in Fig. 10.

In Figures 10 and 11, there is shown a modified form of the invention, in which the heating medium for drying the coal, instead of being returned to the furnace F, is utilized for pneumatically conveying the coal to the furnace. In this construction, a casing 80, corresponding to casing 56 of the preferred form of the invention, leads from the chamber 81 of the hopper B to the intake side of a stoker fan in the fan casing 82. In the preferred form of the device, referring particularly to Fig. 2, the air for pneumatically conveying the coal to the furnace is admitted to the intake side of a fan in the casing 28 through the air admission pipe 65, so that a second fan 58 is necessary to induce a circulation of hot gases from the furnace through the hopper for drying the coal. In the modified construction, the fan in casing 82 induces a circulation of the coal drying medium, so that the fan 58 of the preferred form is dispensed with.

The fan in casing 82 draws air through the U-shaped tube 83, the air being heated in its passage therethrough. The heated air is then drawn through the pipe 84 into the lower chamber 85 of the hopper and withdawn from the upper chamber 81 into the passage 80 and then into the fan in the casing 82. The construction of the inner portion of the hopper and the circulation of the drying medium therethrough is the same as in the preferred form of the invention and the description thereof is therefore not repeated.

I claim:

1. In a fuel bin having a floor and an open upper end, a pair of spaced transversely extending partitions in the lower portion of said bin, the upper of said partitions extending only partially across said bin and the lower of said partitions extending completely across said bin, the upper portion of said fuel bin providing a storage space for fuel, the fuel in said storage space covering and being supported on the exposed upper surface of said partitions and forming a seal over the partitioned portion of said bin, a central rotatable shaft extending vertically in said bin, an arm extending radially from said shaft for effecting movement of fuel from the exposed portion of said lower partition through the space between said partitions, said lower partition being formed beneath said upper partition with an opening through which fuel is discharged, a fuel outlet in the floor of said bin out of register with respect to the opening in said lower partition, an arm extending radially from said shaft for effecting movement of fuel over said bin floor to the fuel outlet therein, a port in said bin communicating with the space between said lower partition and the bin floor for admission of a gaseous heating medium, and a port in said bin communicating with the space between said upper and lower partitions for emission of the heating medium.

2. In a fuel bin having a floor and an open upper end, a pair of spaced transversely extending partitions in the lower portion of said bin, the upper of said partitions extending only partially across said bin and the lower of said partitions extending completely across said bin, the upper portion of said fuel bin providing a storage space for fuel, the fuel in said storage space covering and being supported on the exposed upper surface of said partitions and forming a seal over the partitioned portion of said bin, a central rotatable shaft extending vertically in said bin, an arm extending radially from said shaft for effecting movement of fuel from the exposed portion of said lower partition through the space between said partitions, said lower partition being formed beneath said upper partition with an opening through which fuel is discharged, a fuel outlet in the floor of said bin out of register with respect to the opening in said lower partition, an arm extending radially from said shaft for effecting movement of fuel over said bin floor to the fuel outlet therein, a port in said bin communicating with the space between said lower partition and the bin floor for admission of a gaseous heating medium, a port in said bin communicating with the space between said upper and lower partitions for emission of the heating medium, and baffling means in the partitioned portion of said bin arranged to direct the heating medium in a stream countercurrent with respect to the direction of movement of the fuel.

3. In a fuel bin having a floor and an open upper end, a pair of spaced transversely extending partitions in the lower portion of said bin, the upper of said partitions extending only partially across said bin and the lower of said partitions extending completely across said bin, the upper portion of said fuel bin providing a storage space for fuel, the fuel in said storage space covering and being supported on the exposed upper surface of said partitions and forming a seal over the partitioned portion of said bin, a central rotatable shaft extending vertically in said bin, an arm extending radially from said shaft above said upper partition within the lower portion of said storage space for breaking arch formations in the fuel and effecting movement of fuel onto the exposed portion of said lower partition, said lower partition being formed beneath said upper partition with an opening through which fuel is discharged, an arm extending radially from said shaft for effecting movement of fuel between said partitions to said opening, a fuel outlet in the floor of said bin out of register with respect to the opening in said lower partition, an arm extending radially from said shaft for effecting movement of fuel over said bin floor to the fuel outlet therein, a port in said bin communicating with the space between said lower partition and the bin floor for admission of a gaseous heating medium, a port in said bin communicating with the space between said upper and lower partitions for emission of the heating medium, and baffling means in the partitioned portion of said bin arranged to direct the heating medium in a stream countercurrent with respect to the direction of movement of the fuel.

NATHAN M. LOWER.